US012723887B2

(12) United States Patent
Brown et al.

(10) Patent No.: US 12,723,887 B2
(45) Date of Patent: Sep. 1, 2026

(54) NAVIGATIONAL FEEDBACK DEVICE FOR THE VISUALLY IMPAIRED

(71) Applicant: Purdue Research Foundation, West Lafayette, IN (US)

(72) Inventors: Ethan M. Brown, Bloomington, IN (US); Eric P. O'Keefe, West Lafayette, IN (US); Fernando Vega, West Lafayette, IN (US); Shyam K. Reddy, Bridgeville, PA (US); Ivan Malov, Unterfoehring (DE)

(73) Assignee: Purdue Research Foundation, West Lafayette, IN (US)

( * ) Notice: Subject to any disclaimer, the term of this patent is extended or adjusted under 35 U.S.C. 154(b) by 105 days.

(21) Appl. No.: 18/530,435

(22) Filed: Dec. 6, 2023

(65) Prior Publication Data

US 2024/0192011 A1 Jun. 13, 2024

Related U.S. Application Data

(60) Provisional application No. 63/430,984, filed on Dec. 7, 2022.

(51) Int. Cl.

*G01C 21/36* (2006.01)
*G01C 21/28* (2006.01)
*G06F 3/01* (2006.01)

(52) U.S. Cl.

CPC ......... *G01C 21/3652* (2013.01); *G01C 21/28* (2013.01); *G06F 3/014* (2013.01); *G06F 3/016* (2013.01)

(58) Field of Classification Search

CPC ..... G01C 21/3652; G01C 21/28; G06F 3/014; G06F 3/016

See application file for complete search history.

(56) References Cited

U.S. PATENT DOCUMENTS 6,430,450 B1 8/2002 Bach-y-Rita et al.
9,060,714 B2 * 6/2015 Bajcsy .................. A61B 5/1117
(Continued)

FOREIGN PATENT DOCUMENTS

CN 102631280 A * 8/2012
JP 7180940 B1 * 11/2022
(Continued)

OTHER PUBLICATIONS

English Translation JP7180940B1 (Year: 2025).*
(Continued)

*Primary Examiner* — Rami Khatib
(74) *Attorney, Agent, or Firm* — Piroozi-IP, LLC

(57) ABSTRACT

A wearable device worn by a user is disclosed which includes a plurality of input device interfaces each configured to receive input from a sensor coupled to a user, a controller configured to generate a two-dimensional map of the user's three-dimensional space based on the received inputs, and a plurality of haptic feedback devices disposed on the wearable device, wherein the controller is configured to selectively activate each of the plurality of haptic feedback devices to signal the user's position in the three-dimensional space based on the generated two-dimensional map as the user moves in the three-dimensional space.

18 Claims, 11 Drawing Sheets

(56) References Cited

U.S. PATENT DOCUMENTS

| | | | | |
|---|---|---|---|---|
| 2006/0286972 | A1* | 12/2006 | Kates | H04M 1/72412 455/415 |
| 2008/0120029 | A1 | 5/2008 | Zelek et al. | |
| 2012/0268563 | A1* | 10/2012 | Chou | G01S 15/86 381/310 |
| 2013/0220392 | A1 | 8/2013 | Gassert et al. | |
| 2017/0156964 | A1* | 6/2017 | Padilla Arias | B06B 1/06 |
| 2019/0281473 | A1* | 9/2019 | Liao | H04W 64/003 |
| 2019/0289396 | A1* | 9/2019 | York | G06F 3/165 |
| 2019/0332175 | A1* | 10/2019 | Väänänen | G06V 20/20 |
| 2021/0072029 | A1* | 3/2021 | Marques | G01C 21/206 |
| 2023/0014580 | A1* | 1/2023 | Zhu | G01C 21/3867 |
| 2024/0361141 | A1* | 10/2024 | Amariei | G09B 21/007 |

FOREIGN PATENT DOCUMENTS

| | | | | |
|---|---|---|---|---|
| RU | 2318481 | C1 | 3/2008 | |
| WO | WO-2023239874 | A1 * | 12/2023 | G06F 1/163 |

OTHER PUBLICATIONS

English Translation CN102631280A (Year: 2025).*

American Foundation for the Blind, Glasses That Alert Travelers toObjects Through Vibration? AnEvaluation of iGlasses by RNIB andAmbuTech, 2012.

Dakopoulos et al., A 2D Vibration Array as an Assistive Device for Visually Impaired, IEEE 2007.

Zelek et al., A Stereo-vision System for the Visually Impaired, School of Engineering, University of Guelph, 2001.

Ozioko et al., Smart Tactile Gloves for Haptic Interaction, Communication, and Rehabilitation, Advanced Intelligent Systems, 4, 2100091, 2022.

Gardin et al., A wearable system for mobility improvement of visually impaired people, Visual Comput (2007) 23: 109-118.

Hub et al., Design and Development of an Indoor Navigation and Object Identification System for the Blind, ASSETS'04, Oct. 18-20, 2004.

Maidenbaum et al., The 'EyeCane', a new electronic travel aid for the blind: Technology, behavior & swift learning, Restorative Neurology and Neuroscience·Sep. 2014.

Shoval et al., NavBelt and the GuideCane, IEEE Robotics & Automation Magazine, Mar. 2003.

Bouzit et al., Tactile Feedback Navigation Handle For The Visually Impaired, Proceedings of IMECE2004, 2004 ASME International Mechanical Engineering Congress and RD&D Expo, Nov. 13-19, 2004.

Günther et al., TactileGlove: Assistive Spatial Guidance in 3D Space through Vibrotactile Navigation, PETRA '18, Jun. 26-29, 2018, Corfu, Greece, 2018.

Kaczmarek, The tongue display unit (TDU) for electrotactile spatiotemporal pattern presentation, Scientia Iranica, 2010.

Dakopoulos et al., Wearable Obstacle Avoidance Electronic Travel Aids for Blind: A Survey, IEEE Transactions on Systems, Man, and Cybernetics—Part C: Applications and Reviews, vol. 40, No. 1, Jan. 2010.

Miesenberger et al., Computers helping people with special needs, 13th international conference, ICCHP 2012.

* cited by examiner

10

NAVIGATIONAL FEEDBACK DEVICE FOR THE VISUALLY IMPAIRED

CROSS-REFERENCE TO RELATED APPLICATIONS

The present non-provisional patent application is related to and claims the priority benefit of U.S. Provisional Patent Application Ser. 63/430,984, filed Dec. 7, 2022, the contents of which are hereby incorporated by reference in its entirety into the present disclosure.

STATEMENT REGARDING GOVERNMENT FUNDING

None.

TECHNICAL FIELD

The present disclosure generally relates to assist devices and systems for visually impaired individuals, and in particular to an assist device and system providing navigation feedback.

BACKGROUND

This section introduces aspects that may help facilitate a better understanding of the disclosure. Accordingly, these statements are to be read in this light and are not to be understood as admissions about what is or is not prior art.

Most visually impaired individuals currently use a cane to move and interact with the world. This tool has been left as the primary means of navigating unfamiliar environments with few attempts at innovating and improving an assist device. The cane has clear shortcomings, e.g., any physical feedback provided to the individual is limited by the length of the cane, and auditory feedback falls short in many loud environments.

Further, the cane does not provide useful directional navigational feedback to the user in large, open spaces due to the lack of physical references and landmarks. Additionally, a risk of damage to the cane exists when navigating tight spaces and crowded environments potentially leaving the user with no backup method of navigation. While a cane is relatively cheap, it does not give the user much confidence and eliminates the use of one of their hands. In order for the user to use both hands, they must stow the cane away or fold it up and tuck it in temporarily. This proves to be cumbersome to the user and fact that it takes one hand to use, effectively negating the usefulness of that hand for anything else, and thus is a large drawback for its use.

Therefore, there is an unmet need for a novel assist device and system that can provide navigational information to a visually impaired person.

SUMMARY

A wearable device worn by a user is disclosed which includes a plurality of input device interfaces each configured to receive input from a sensor coupled to a user, a controller configured to generate a two-dimensional map of the user's three-dimensional space based on the received inputs, and a plurality of haptic feedback devices disposed on the wearable device. The controller is configured to selectively activate each of the plurality of haptic feedback devices to signal the user's position in the three-dimensional space based on the generated two-dimensional map as the user moves in the three-dimensional space.

A system of providing haptic feedback to a user is also disclosed which includes a plurality of input devices coupled to a user each configured to provide a signal, a controller configured to receive the provided signals and in response to generate a two-dimensional map of the user's three-dimensional space, and a wearable device. The wearable device includes a plurality of haptic feedback devices disposed on the wearable device. The controller is configured to selectively activate each of the plurality of haptic feedback devices to signal the user's position in the three-dimensional space based on the generated two-dimensional map as the user moves in the three-dimensional space.

A method of providing haptic feedback to a user is also disclosed. The method includes receiving inputs from a plurality of input devices worn by a user. The method also includes generating a two-dimensional map of the user's three-dimensional space based on the received inputs. Additionally, the method includes selectively activating each of a plurality of haptic feedback devices disposed on the wearable device to signal the user's position in the three-dimensional space based on the generated two-dimensional map as the user moves in the three-dimensional space.

DETAILED DESCRIPTION

Figure 1A:
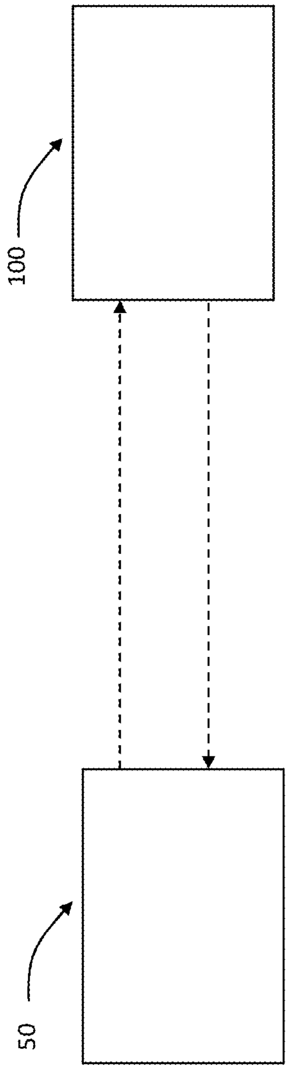
FIG. 1A is a block diagram is shown depicting an assist system, according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel assist device and system are disclosed herein that can provide navigational information to a visually impaired person. Towards this end, environmental sensing devices worn by a user are coupled with a computing device to interpret and analyze information from the environmental sensing devices, followed by activating actuators on a wearable actuator system worn by the user, e.g., a glove with actuators disposed on each of the glove digits, to alert the user of their relative position in the environment and their proximity to various objects to thereby provide the user with a three-dimensional (3D) awareness of her environment. Two primary modalities for sensing and computing a user's environment are disclosed. The first mode includes a single-board computer (SBC), e.g., disposed on the wearable actuator system, coupled with external environmental sensing devices, e.g., a LiDAR, a stereo, or a structured light camera device, known to a person having ordinary skill in the art. The sensing devices would send data to the SBC to be processed, which would then actuate the feedback device, i.e., the actuators worn by the user. Locations of the external environmental sensing devices could be either on the user's chest, with a mount, or on some other wearable system, e.g., a headband, a hat, or on the wearable actuator system itself.

The second modality is based in a mobile device, such as a smartphone, e.g., an iPhone, positioned on or coupled to the user, e.g., on a chest harness or handheld, to handle both the sensing and computing. This modality allows for much faster processing while providing several robust sensor choices, including LiDAR, stereo and structured light sensors. Once the user's mobile device has sensed and processed the data, it would send data either wirelessly, using e.g. Bluetooth, or wired, using e.g. a serial or parallel communication scheme, to the wearable actuator system. This modality would also allow over the air updates in the form of a mobile application update to improve functionality for end users over time.

For providing feedback to a user, a system is disclosed capable of providing haptic feedback to a user in the form of a wearable actuator system. The system is based on mechanical actuation and electromechanical control of the actuators. The system is based on actuators disposed on a user's hand, directly on the skin or on a glove. A matrix of actuators is thus generated, with a plurality of rows, e.g., four or five columns of actuators for four or five digits, placed on the hand running in the radial direction with a plurality of rows, e.g., 3 rows placed for each column, thus providing a plurality of actuators, e.g., a total of 12 or 15 actuators or more or less disposed on the digits, again on the skin or on a glove. Each actuator is positioned to avoid interferences with natural movement of a corresponding digit. For example, each actuator is positioned centrally about the proximal phalanx, middle phalanx, or distal phalanx. Each actuator of the plurality of actuators may be controlled independently or dependently from or upon other actuators of the plurality of actuators. Actuators may include solenoids, piezoelectric actuators, thermoelectric actuators, pneumatic actuators, vibrational motors (e.g., using a motor with an eccentricity), force or pressure applying devices, and other haptic feedback type devices, known to a person having ordinary skill in the art. Different modalities of frequency, pulse width modulation, amplitude, or a combination thereof may be used to provide informative feedback to the user via the actuators.

Figure 5:
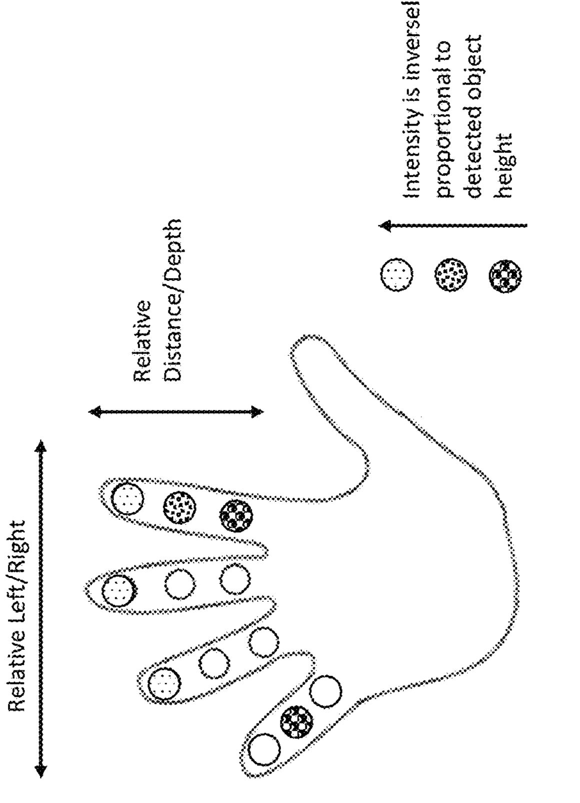
FIG. 5 is a schematic of actuators on an instrumented glove based on the first modality and in connection with FIG. 4.
Figure 4:
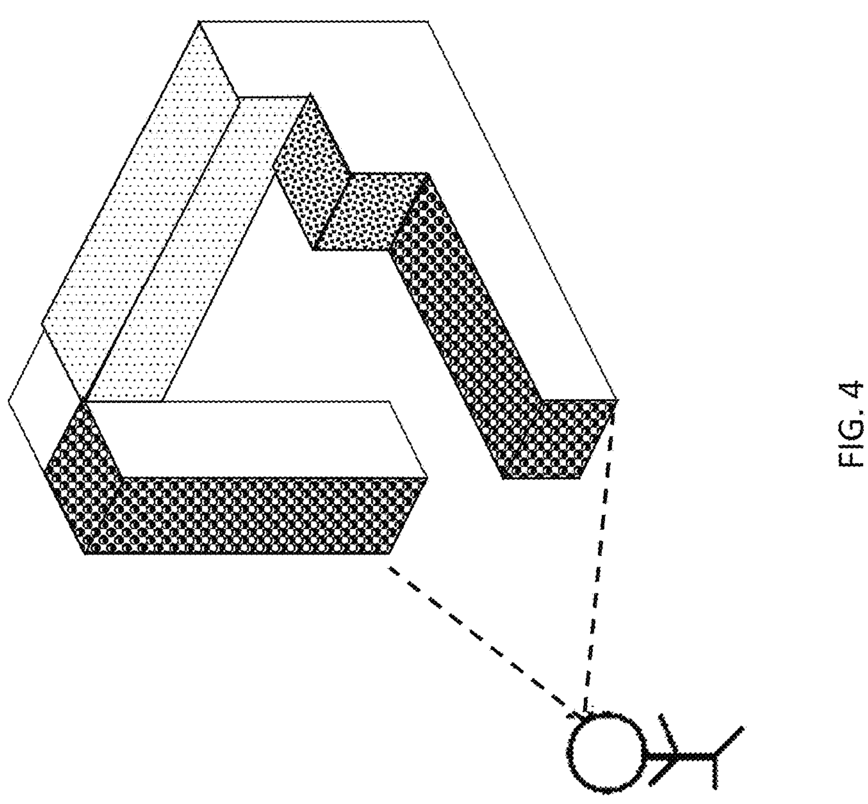
FIG. 4 is a schematic of objects in front of a user according to a first modality.

The environmental sensing devices may be configured in 3 modalities. First, to provide a top-down, bird's-eye point-of-view of the user's environment to thereby map corresponding dimensions to the wearable actuator system held flat with palm of glove facing down and pointing to the ground and tips of digits of the glove are pointing away from the user. Objects are mapped to each actuator, e.g., actuators positioned on the digits in the case of a hand-based system, e.g., an instrumented glove, corresponding to their relative position left to right of the user and object distance or depth is mapped along the length of the plurality of actuators. The vertical relative position of the object is mapped to the intensity, e.g. pressure or voltage, of the actuators with high levels of intensity for objects relatively low to the user, and with low intensity for objects relatively high to the user. Additionally, large objects may activate multiple actuators with various intensity depending on size and relative position to the user. In the case of an object occupying a large vertical space, the lowest detected portion of the object will dominate the actuator intensity, resulting in high intensity. For example, objects detected left of the user are mapped onto the actuators positioned on the leftmost digit. The same principle applies to objects to the right of the user, with objects being mapped onto the actuators on the rightmost digit, again based on evenly divided spatial segments. In a similar vein, objects detected directly in front of the user are mapped onto the actuators on the middle digits. As the user approaches these objects, the actuators on each digit are successively actuated. For example, as a user approaches an object, first the actuator on the distal phalanx is actuated, next the actuator on the middle phalanx is actuated, and finally the actuator on the proximal phalanx is actuated. The relative vertical position of the object is mapped to the intensity of the actuator corresponding to its relative position (left, right, or center, and its relative distance or depth). FIG. 4 illustrates an example case in which the user interacts with a large object of unique size, shape, and relative positioning in all 3 dimensions. FIG. 5 shows the corresponding activation of an example set of actuators with various intensities.

In the specified embodiment, the generation of depth images is facilitated through the employment of depth-sensing modalities, e.g., LiDAR, stereo and structured light imaging technologies. Once acquired, these are transformed into a structured occupancy grid, arranged into an array that mirrors the configuration of the tactile actuators, exemplified by, but not limited to, an arrangement of four columns and three rows. Each cell within this grid, reflective of the overhead environmental view, undergoes analysis to discern the vertical positioning of objects, thereby determining their corresponding actuation intensities for the haptic device. This process involves identifying the object of maximal elevation within each cell. Following this identification, the system computes the divergence between the object's elevation and a predefined, adjustable maximum height level. The intensity of the tactile actuators' response is then modulated in proportionality or otherwise to the ascertained divergence and transmitted to the respective actuator. That is, the actuator intensity is inversely proportional to the detected height of the object. Objects positioned at higher elevations yield lower actuation intensities, while those at lower elevations result in higher intensities. The maximum distance outward, e.g. 1.5 meters, of the user is determined by an adjustable, predefined value. This distance is divided into even-distanced segments according to the number of rows of actuators, e.g. 3 rows, with each segment being mapped to its subsequent row of actuators, e.g. each row of actuators corresponding to 0.5 meters of distance outward. Similarly, the maximal distance side-to-side of the user is determined by a separate adjustable, predefined value, e.g. 2 meters. This distance is divided into even-distanced segments according to the number of columns of actuators, e.g. 4 columns, with each segment being mapped to its subsequent column of actuators, e.g. each column of actuators corresponding to 0.5 meters of distance side-to-side. For example, with the example distances, the actuator on the left most finger at the distal phalanx will correspond to an area of dimensions 0.5 m outward by 0.5 m side-to-side in the left most far corner of the sensed area.

The user feedback device may be configured for the total actuator intensity range to be continuously scaled to the user selected maximum height level. The continuous range of feedback provides high resolution communication to the user. Alternatively, the user feedback device may be configured for the total actuator intensity range to be split into smaller, discrete height ranges corresponding to discrete levels of actuator intensity. For example, objects detected between about 0 and 1 meter correspond to an intensity of about 100%. Objects detected between about 1 and 2 meters correspond to an intensity of about 60%. Objects detected between about 2 and 3 meters correspond to an intensity of about 30%. The discrete distance or height ranges may be adjustable by the user. Similarly, the discrete actuator intensities may be adjustable by the user. The use of discrete actuation allows for absolute positional reference by the end user.

Figure 6B:
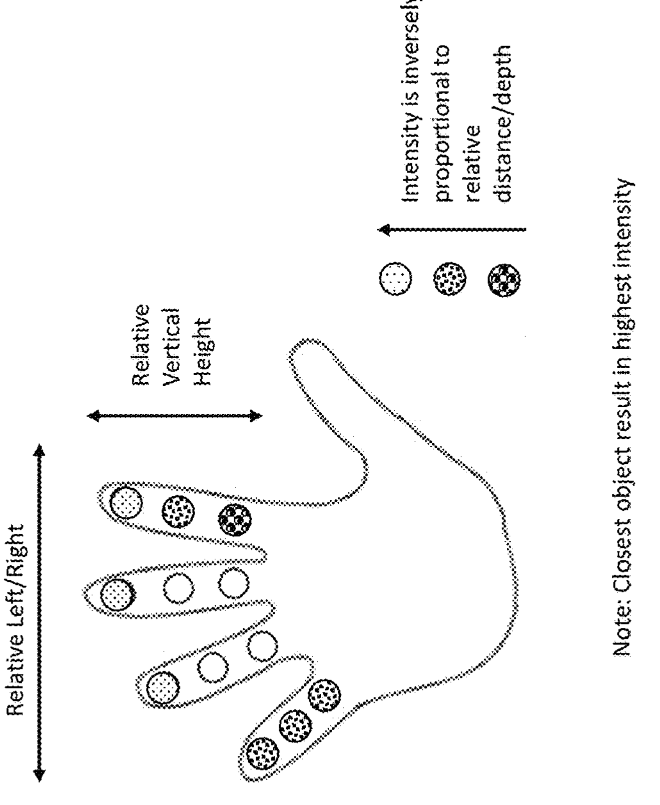
FIG. 6B is a schematic of actuators on an instrumented glove based on the second modality and in connection with FIG. 6A.
Figure 6A:
FIG. 6A is a schematic of objects in front of a user according to a second modality.
Figure 6A:
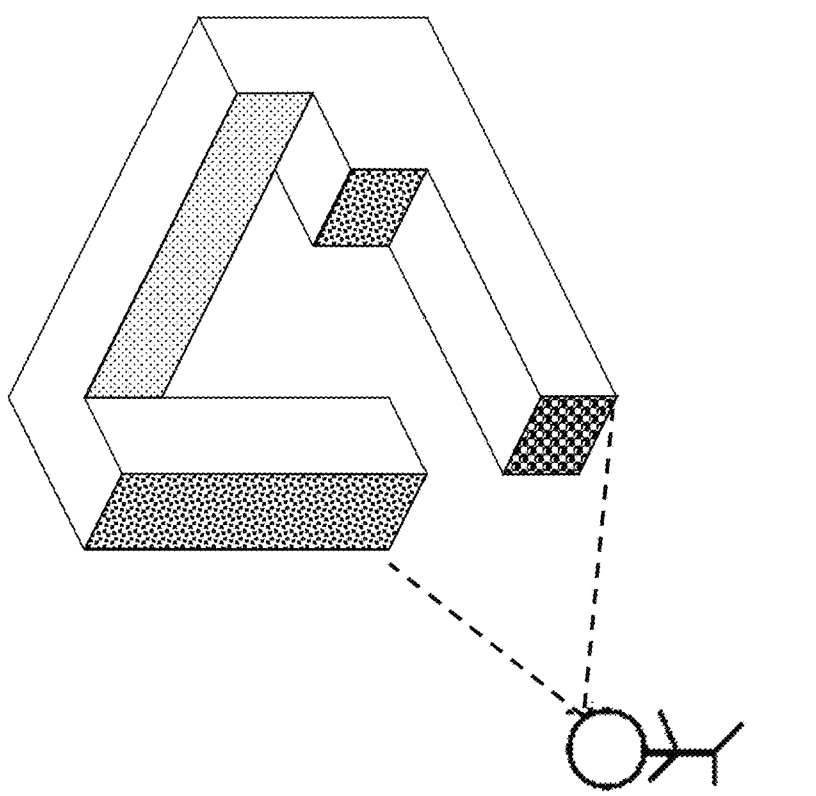

The environmental sensing devices may alternatively be configured to a second modality to provide line-of-sight point-of-view of the user's environment to thereby map corresponding dimensions to the wearable actuator system held flat with palm facing outward away from the user and digits of the glove facing upward. Objects are mapped to each actuator, e.g., actuators positioned on the digits in the case of a hand-based system, e.g., an instrumented glove, corresponding to their relative position left to right of the user and object vertical relative position is mapped along the length of the plurality of actuators. The relative distance or depth of the object is mapped to the intensity, e.g. pressure or voltage, of the actuators. For example, objects to the left, right, or centrally ahead of the user are mapped onto the actuators on the leftmost digit, rightmost digit, or middle digits, respectively, similar to the first modality. The relative vertical position of the objects is mapped to the actuator position along the digit. For example, objects positioned relatively low to the user will activate the actuator on the proximal phalanx. Objects positioned relatively high to the user will activate the actuator on the distal phalanx. Objects in relatively central vertical position will activate the actuator on the middle phalanx. As the user approaches these objects, the actuators on each digit will independently increase in intensity. For example, objects relatively far from the user will actuate with low intensity while objects close to the user will actuate with high intensity. FIG. 6A illustrates another example case in which the user interacts with a large object of unique size, shape, and relative positioning in all 3 dimensions. FIG. 6B shows the corresponding activation of an example set of actuators with various intensities.

In the specified embodiment, the generation of depth images is facilitated through the employment of depth-sensing modalities, e.g., LiDAR, stereo and structured light imaging technologies. Once acquired, these depth images are systematically segmented into an array that mirrors the configuration of the tactile actuators, exemplified by, but not limited to, an arrangement of four columns and three rows. Each individual cell within this array is subjected to analysis to identify the pixel representing the object of minimum depth. Following this identification, the system calculates the variance between the proximal distance of this object and a predetermined, adjustable maximum distance. Subsequently, the intensity of the tactile actuators' response is modulated in direct proportionality or otherwise to the ascertained variance. The distance or depth range and height range of objects detected to be communicated to the user through the actuators is continuously adjustable to the user up to the maximum detection range dictated by the sensor. For example, the sensor maximum depth is 3 meters and will detect objects within the maximum range. If desired, the user may adjust the communicated depth to 2 meters, and objects detected within that range will be appropriately scaled and communicated through the actuators.

The user feedback device may be configured for the total actuator intensity range to be continuously scaled to the user selected maximum range. For example, as the user approaches an object from a distance equal to the maximum adjustable range previously selected up to the minimum adjustable range previously selected, the intensity of each actuator will increase continuously from about 0% to about 100%. Alternatively, the user feedback device may be configured for the total actuator intensity range to be split into smaller, discrete ranges corresponding to discrete levels of actuator intensity. For example, objects detected between about 0 and 1 meter correspond to an intensity of about 100%. Objects detected between about 1 and 2 meters correspond to an intensity of about 60%. Objects detected between about 2 and 3 meters correspond to an intensity of about 30%. The discrete distance or height ranges may be adjustable by the user. Similarly, the discrete actuator intensities may be adjustable by the user. The use of discrete actuation allows for absolute positional reference by the end user.

Figure 7B:
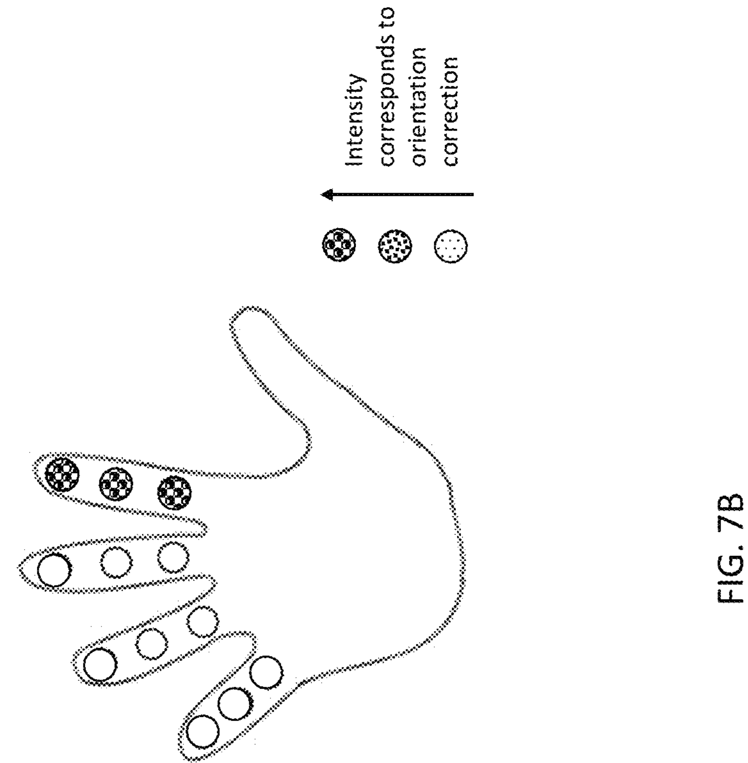
FIG. 7B is a schematic of actuators on an instrumented glove based on the third modality and in connection with FIG. 7A.
Figure 7A:
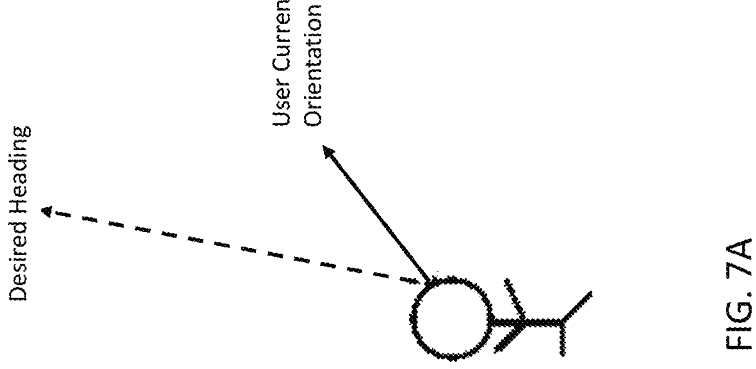
FIG. 7A is a schematic of orientation of a user according to a third modality.
Figure 8B:
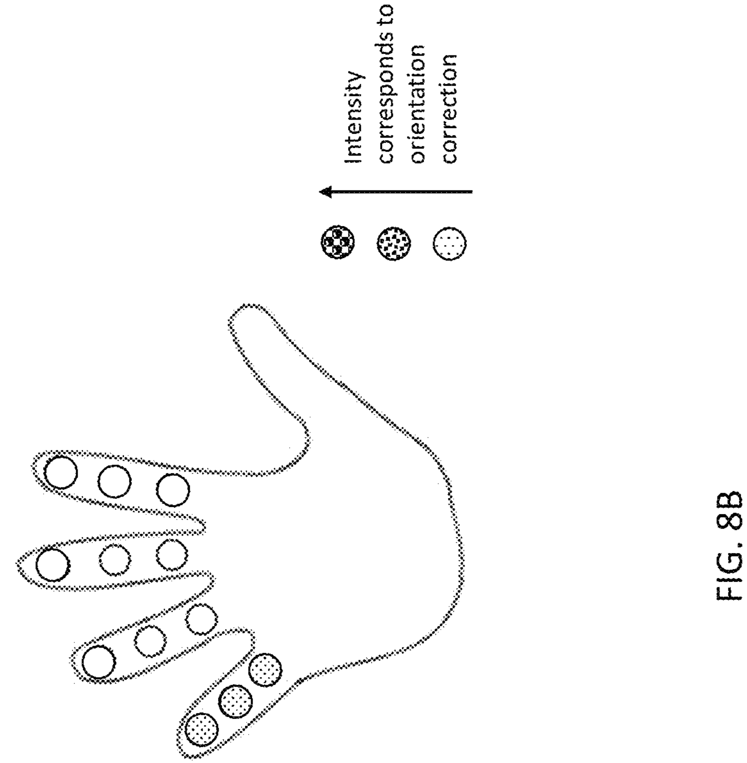
FIG. 8B is a schematic of actuators on an instrumented glove based on the third modality and in connection with FIG. 8A.
Figure 8A:
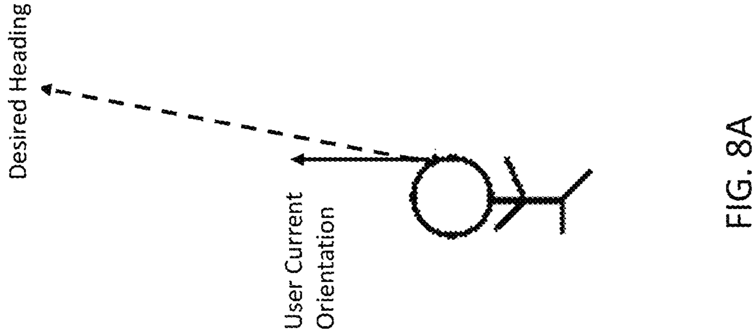
FIG. 8A is a schematic of orientation of a user according to the third modality.

The environment sensing devices may yet alternatively be configured to a third modality to provide orientation-based navigation towards or away from a desired heading with a top-down, bird's-eye point-of-view in which the wearable actuator system is held flat with palm of glove facing down and pointing to the ground and tips of digits of the glove are pointing away from the user. The desired heading is predetermined by the user and direction of user reorientation is mapped to actuators, e.g., actuators positioned on the digits in the case of a hand-based system, and successively actuates as the user orientation changes relative to the desired predetermined heading. Magnitude of relative orientation is mapped to the intensity of all actuators along the leftmost and rightmost digits corresponding to a predetermined sensitivity selected by the user. For example, a predetermined desired heading to the left of the user's current orientation will actuate the actuators on the rightmost digit at a high intensity as illustrated in FIG. 7A and FIG. 7B. As the user reorients by turning or rotating in the left direction, the actuation intensity on the rightmost digit will decrease. Similarly, a predetermined desired heading to the right of the user's current orientation will actuate the actuators on the leftmost digit at a high intensity. As the user reorients by turning or rotating in the right direction, the actuation intensity on the leftmost digit will decrease. FIG. 8A illustrates another example in which the predetermined desired heading is to the right of the user's current orientation and the magnitude of relative orientation is small by the adjustable, predefined sensitivity selected by the user.

In the specified embodiment, an orientation reference, e.g., electronic compass is employed to calculate the magnitude of relative orientation by subtracting the actual heading from a user-defined desired heading. This differential is then applied to a proportional gain system or otherwise. The intensity of actuation across all actuators on each digit is modulated in direct correlation to this computed magnitude, in accordance with a sensitivity level predetermined by the user.

Figure 1B:
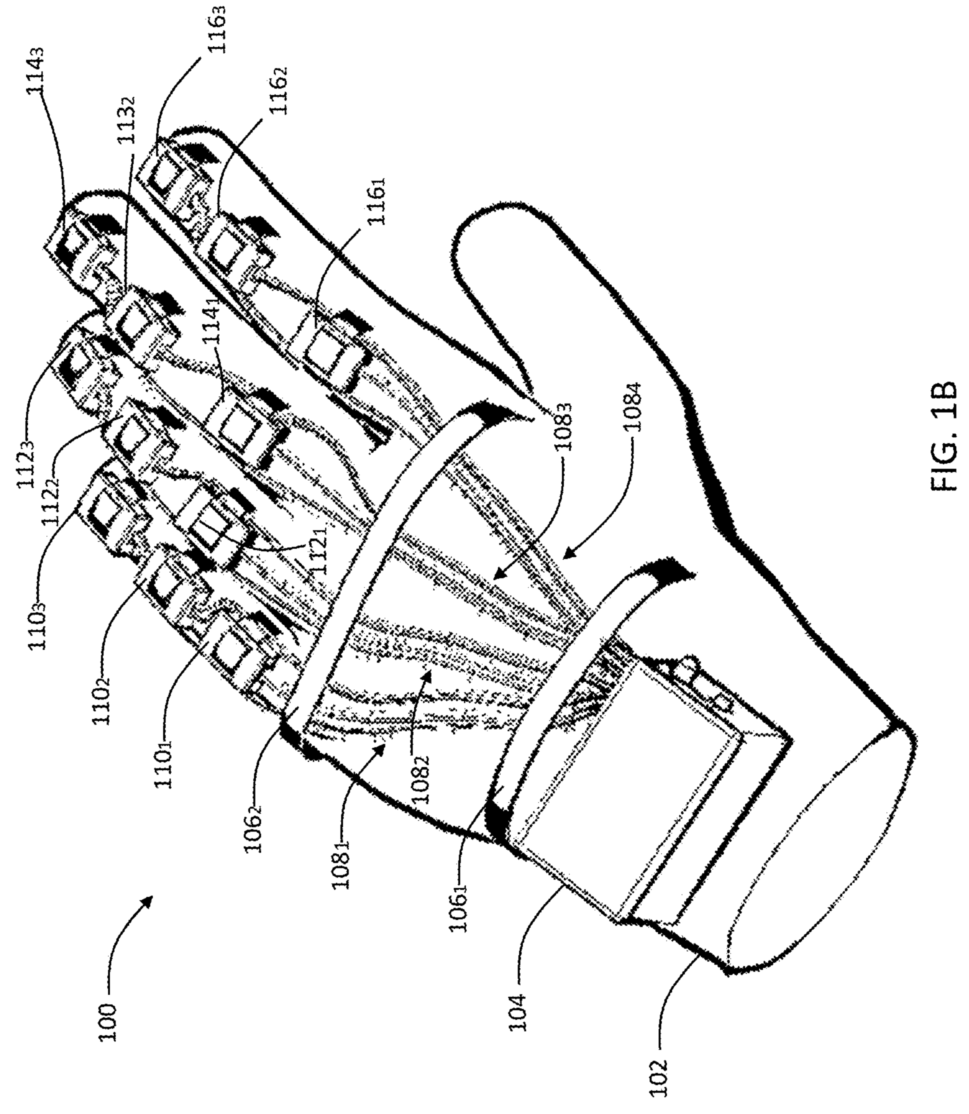
FIGS. 1B and 1C FIGS. are perspective views of the wearable actuator system of the present disclosure, in which an instrumented glove is shown.
Figure 1C:
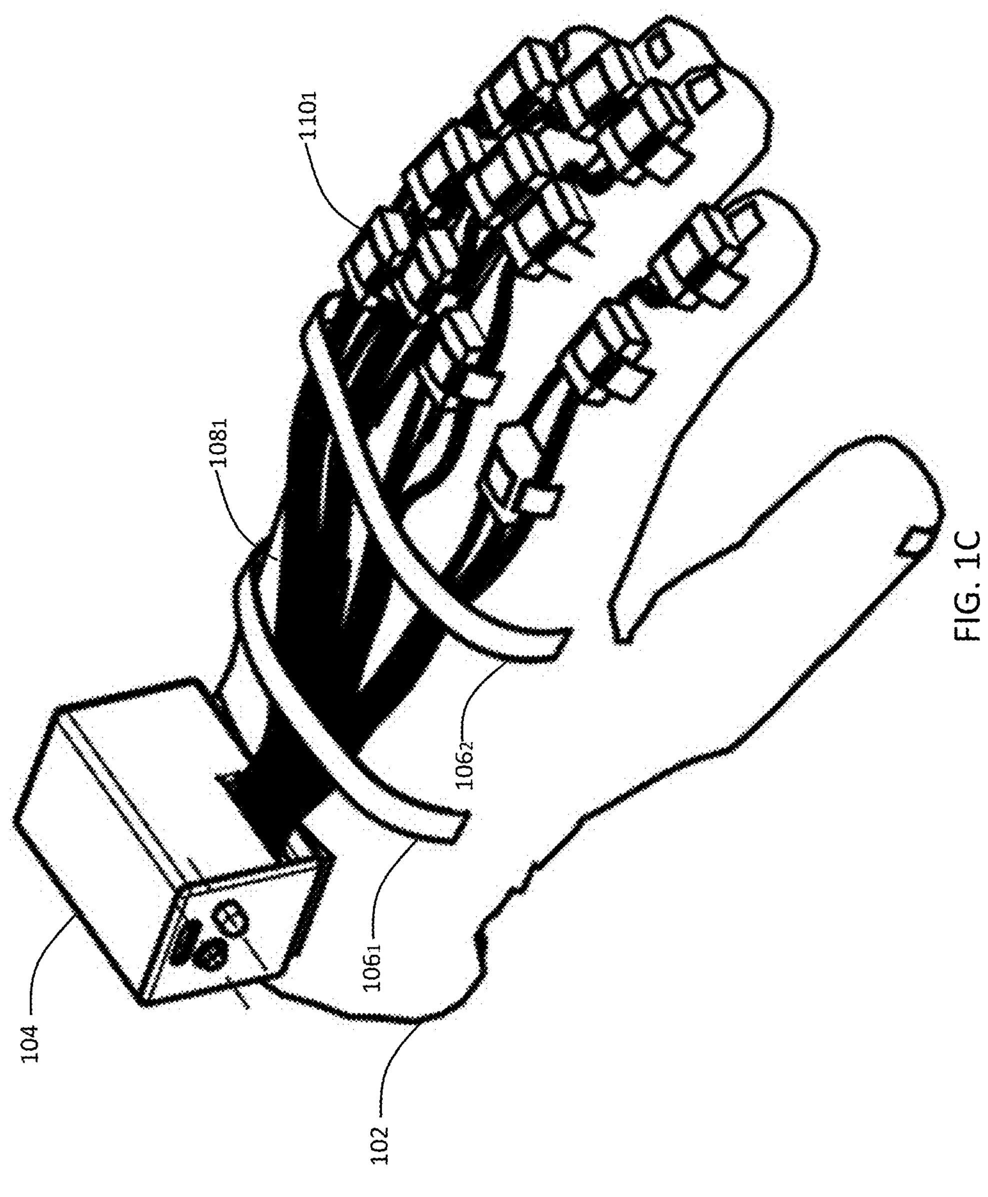

Referring to FIG. 1A, a block diagram is shown depicting an assist system 10, according to the present disclosure. The assist system 10 includes environment sensing devices 50 in wired or wireless communication with a wearable actuator system 100. One embodiment of the wearable actuator system 100 is shown in FIGS. 1B and 1C which are perspective views of the wearable actuator system 100, in which an instrumented glove 102 is shown. The instrumented glove 102 is coupled to a computing device 104 adapted to receive signals from the environmental sensing devices, analyze those signals, and in response actuate a plurality of actuators, discussed below. Alternatively, the computing device 104 may be positioned with the environment sensing devices and the block referenced as 104 is instead only an actuating circuit. Two holders $\mathbf{106}_1$ and $\mathbf{106}_2$ are provided to ensure sets of cables $\mathbf{108}_1$, $\mathbf{108}_2$, $\mathbf{108}_3$, and $\mathbf{108}_4$ are securely attached to the glove instrumented 102. As discussed in relations to the example provided above, the wearable actuator system 100 provides a plurality of actuators.

The wearable actuator system 100 is capable of providing haptic feedback to a user. The wearable actuator system 100 is based on mechanical actuation and electromechanical control of the actuators disposed on the instrumented glove 102. A matrix of actuators is thus generated, with a plurality of rows, four rows of actuators for four digits are shown, placed on the instrumented glove 102 running in the radial direction with a plurality of columns, 3 columns are shown for each row, thus providing a plurality of actuators. These actuators numbered as $\mathbf{110}_1$, $\mathbf{110}_2$, and $\mathbf{110}_3$ are for the leftmost digit; $\mathbf{116}_1$, $\mathbf{116}_2$, and $\mathbf{116}_3$ are for the rightmost digit; and $\mathbf{112}_1$, $\mathbf{112}_2$, $\mathbf{112}_3$, $\mathbf{114}_1$, $\mathbf{114}_2$, and $\mathbf{114}_3$ are for the middle digits. Each actuator is positioned to avoid interferences with natural movement of a corresponding digit. Actuators may include solenoids, piezoelectric actuators, thermoelectric actuators, vibrational motors (e.g., using a motor with an eccentricity), force or pressure applying devices, and other haptic feedback type devices, known to a person having ordinary skill in the art. Different modalities of frequency, pulse width modulation, amplitude, or a combination thereof may be used to provide informative feedback to the user via the actuators.

Figure 2:
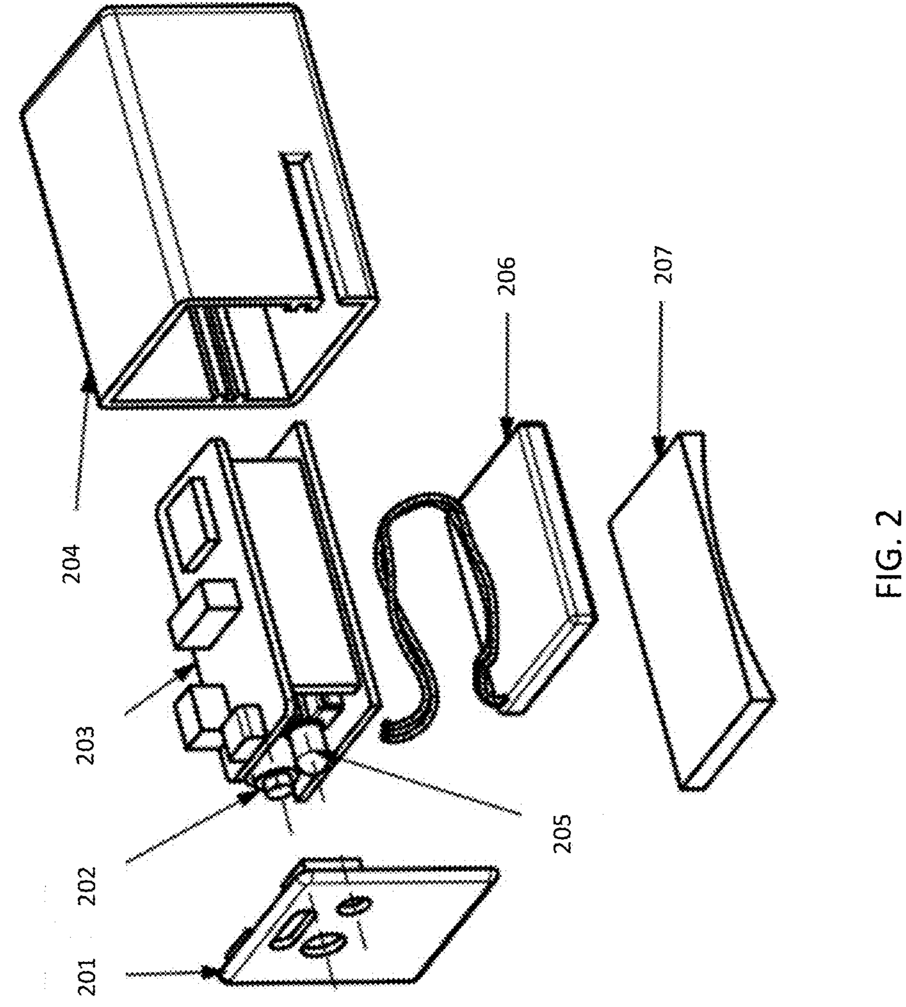
FIG. 2 is an exploded perspective view of a computing device according to the present disclosure.

Referring to FIG. 2, an exploded perspective view of the computing device 104 is provided. The computing device 104 includes a lid 201 configured to provide an enclosed enclosure for the computing device 104, a button 202 that can be used to provide input by the user, including a reset functionality, and a microcontroller circuit 203 including a microcontroller (not shown) with all the supporting circuitry (not shown), including external memory, input/output interfaces, analog/digital and digital/analog converters, and actuator drivers, all known to a person having ordinary skill in the art. The computing device 104 also includes a case 204 in which the aforementioned microcontroller circuit 203 is placed, as well as a light emitting diode 205 which provides information to a technician regarding the computing device 104. Additionally, the computing device 104 includes a battery 206 electrically coupled to the microcontroller circuit 203 and an attachment means 207, e.g., a hook and loop strip to be coupled with a complementary hook and loop on the instrumented glove 102 (see FIG. 1B).

Figure 3A:
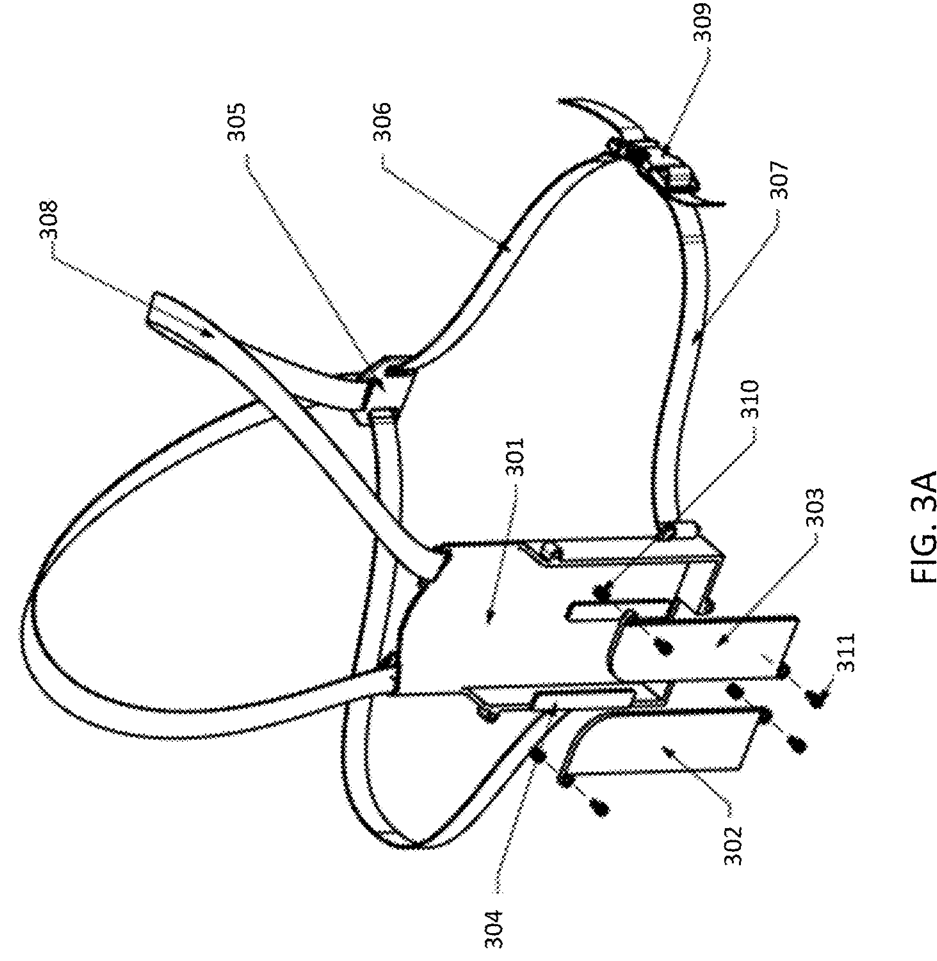
FIG. 3A is a perspective view of a holder.

The environment sensing device 50 (see FIG. 1A), according to one embodiment, is held in a holder 300, as shown in the perspective view provided in FIG. 3A. The holder 300 is configured to provide a chest harness for receiving a smartphone or other dedicated devices providing environmental sensing functionality including Lidar, RGB-D cameras, sonar, laser- and photodetector, radar, electronic compass, global position system (GPS) sensors, accelerometer, temperature, and other distance and environmental measuring devices known to a person having ordinary skill in the art. The holder 300 includes a shell 301 configured to hold the environment sensing devices 50, a right panel 302 and a left panel 303 configured to provide support for the environment sensing devices 50, rubber strips 304 configured to provide resistance to movement and protection of the environment sensing devices 50, a rear bracket 305 configured to provide support against the back of the user, straps 306. 307, and 308, a buckle 309 configured to provide adjustability of strap length, and fasteners 310 and 311 for fastening the right and left panels 302 and 303 to the shell 301.

Figures 3B, 3C:
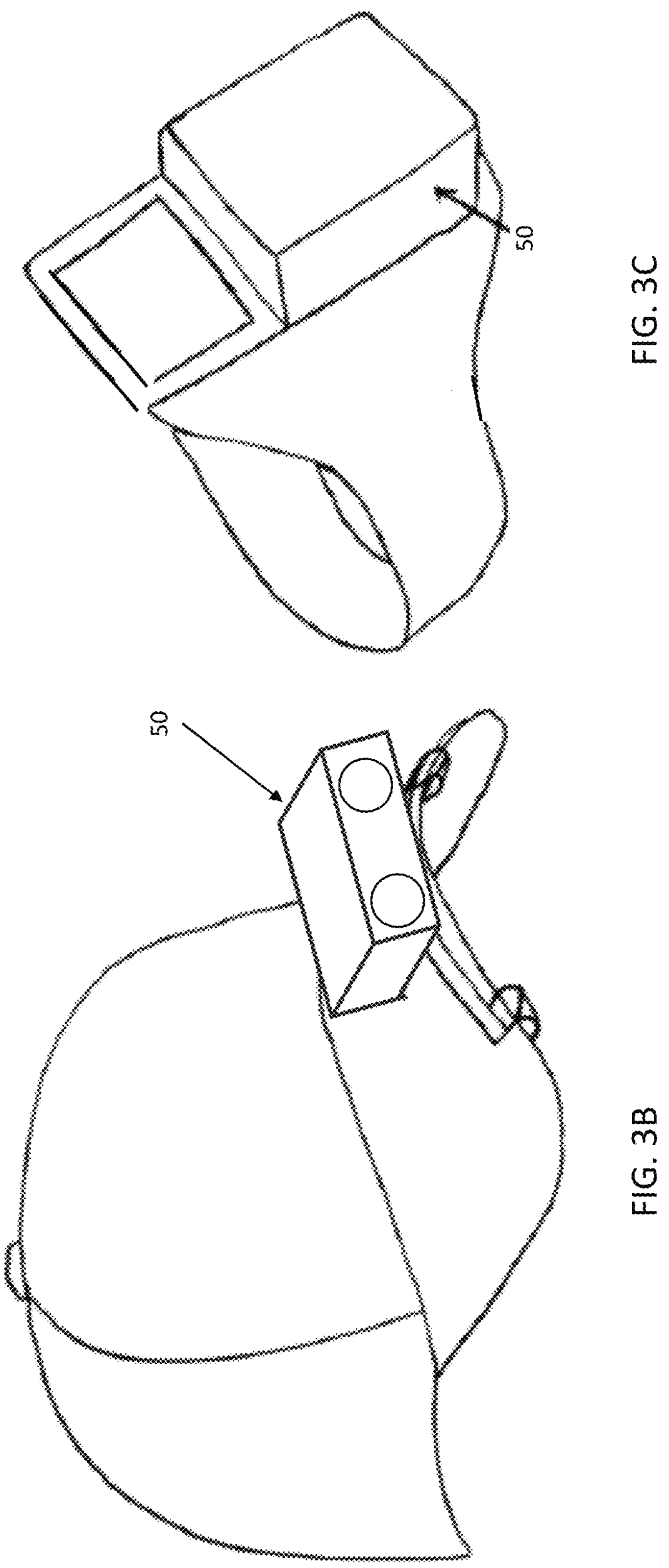
FIG. 3B is a perspective view of a holder and the environment sensing device attached to a hat.
FIG. 3C is a perspective view of a holder as a headband.
Figure 3D:
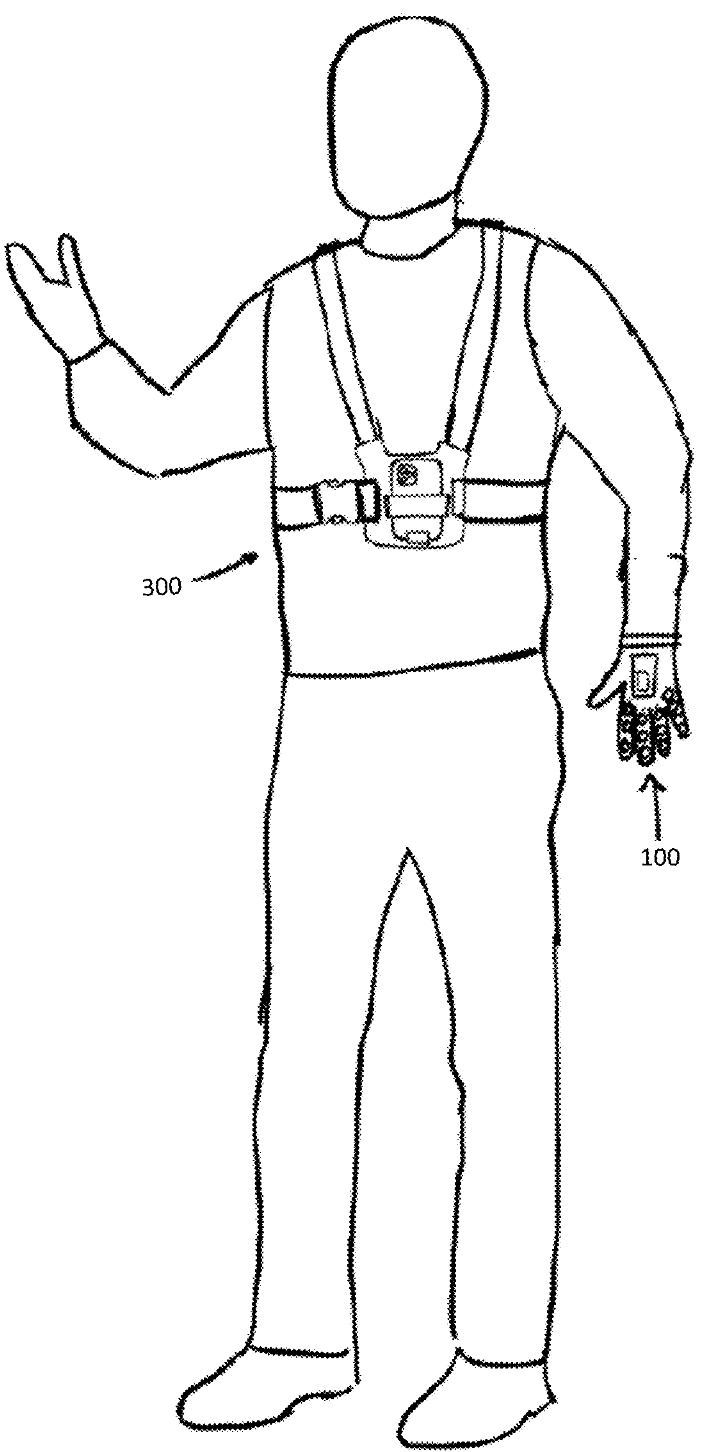
FIG. 3D is a schematic showing the user wearing the holder of FIG. 3A and a wearable actuator system according to the present disclosure.

The holder 300 is shown in two additional embodiments in FIGS. 3B and 3C for wearing by the user. FIG. 3B is a perspective view of a holder and the environment sensing device attached to a hat and FIG. 3C is a perspective view of a holder as a headband. FIG. 3D is a schematic showing the user wearing the holder 300 and the wearable actuator system 100.

FIG. 4A and FIG. 4B are schematics showing proximity of a user to objects and how the wearable actuator system actuates the actuator to correspond to said objects. As discussed above, objects on the left side of the user result in actuation of the actuators on the leftmost digit; objects on the right side of the user result in actuation of the actuators on the rightmost digit; while objects straight ahead of the user result in actuation of the actuators on the middle digits. Furthermore, proximity of the objects based on predetermined thresholds, result in successive actuation of the actuators on said digits. For example, in the schematic shown in FIG. 4A, the user is closest to the objects on the right and left side of the user. Assuming the predetermined threshold for distance has been met, all actuators on both leftmost digit and rightmost digit are thus actuated signaling to the user of her proximity to these objects. At the same time, since objects straight ahead are further, only one of the actuators on the middle digits are actuated, signaling to the user that there is an object straight ahead but its distance is less than the objects on the right side and the left side. As the user continues to approach the objects on the right side and the left side, while all actuators on the leftmost and rightmost digits are actuated, the amplitude, frequency, and pulse width modulation of the actuators can be varied to further indicate diminishing or increasing proximity to these objects.

It should be appreciated that software housed on a non-transient memory is executed by the controller (or microcontroller) discussed herein to receive input from sensing devices, process the received input, and generate output in the form of actuation signals for the actuators discussed herein. The controller (or microcontroller) is combined with interface circuitry, known to a person having ordinary skill in the art, to accept signals from the sensing devices and to actuate the actuators.

Those having ordinary skill in the art will recognize that numerous modifications can be made to the specific implementations described above. The implementations should not be limited to the particular limitations described. Other implementations may be possible.

The invention claimed is:

1. A wearable device worn by a user, comprising:

a controller as part of a single board computer or a smartphone configured to execute software maintained on a non-transitory memory and further configured to receive inputs from a plurality of sensors corresponding to a user's environment to generate a two-dimensional map of the user's three-dimensional space including spacing in an X-direction (a direction parallel to left-to-right of the user), spacing in Y-direction (a direction parallel to forward of the user that is perpendicular to the X-direction), and spacing in the Z-direction (a direction parallel to up-and-down of the user that is perpendicular to the X-direction and the Y-direction) based on the received inputs;

a set of haptic devices forming a matrix of a plurality of m columns and a plurality of n rows disposed on an instrumented glove, wherein each finger of the instrumented glove is outfitted with a plurality of haptic devices, thus allowing for m×n haptic devices, wherein the controller is configured to mirror the two-dimensional map to the m×n matrix representing the plurality of haptic devices and to selectively activate each of the plurality of haptic devices to signal the user's position in the three-dimensional space based on the generated two-dimensional map as the user moves in the three-dimensional space, wherein the activation of the plurality of haptic devices is based on variation in intensity of the plurality of haptic devices based on proximity to detected objects by the plurality of sensors of differing heights and distances in the X-direction, the Y-direction, and the Z-direction, wherein shorter detected objects in the Z-direction result in higher intensity of the plurality of haptic devices and closer detected objects result in higher intensity of the plurality of haptic devices.

2. The wearable device of claim 1, wherein the plurality of sensors includes one or more cameras, sonar, accelerometer, radar, global positioning system, electronic compass, and lidar.

3. The wearable device of claim 1, wherein the plurality of haptic devices includes one or more vibrational devices, pressure devices, or temperature devices.

4. The wearable device of claim 1, wherein each one of the plurality of haptic devices is disposed on one of proximal phalanx, middle phalanx, and distal phalanx spaces of the glove.

5. The wearable device of claim 4, wherein each one of the plurality of haptic devices is selectively activated along each of the proximal phalanx, middle phalanx, and distal phalanx spaces on each digit based on the user's position in the three-dimensional space.

6. The wearable device of claim 1, wherein the user's position in the three-dimensional space includes the user's heading, navigation information, and positional information to an object, wherein the object includes one or more of a sidewalk, grass, crosswalks, doorways, stairs, and articles positioned in the path of the user.

7. A system of providing haptic feedback to a user, comprising:

a plurality of sensors worn by a user each configured to provide a signal corresponding to the user's environment;

a controller as part of a single board computer or a smartphone configured to execute software maintained on a non-transitory memory and further configured to receive the provided signals and in response to generate a two-dimensional map of the user's three-dimensional space including spacing in an X-direction (a direction parallel to left-to-right of the user), spacing in Y-direction (a direction parallel to forward of the user that is perpendicular to the X-direction), and spacing in the Z-direction (a direction parallel to up-and-down of the user that is perpendicular to the X-direction and the Y-direction);

an instrumented glove, comprising:

a set of haptic devices forming a matrix of a plurality of m columns and a plurality of n rows disposed on the instrumented glove, wherein each finger of the instrumented glove is outfitted with a plurality of haptic devices, thus allowing for m×n haptic devices, wherein the controller is configured to mirror the two-dimensional map to the m×n matrix representing the plurality of haptic feedback devices and to selectively activate each of the plurality of haptic devices to signal the user's position in the three-dimensional space based on the generated two-dimensional map as the user moves in the three-dimensional space, wherein the activation of the plurality of haptic devices is based on variation in intensity of the plurality of haptic feedback devices based on proximity to detected objects by the plurality of sensors of differing heights and distances in the X-direction, the Y-direction, and the Z-direction, wherein shorter detected objects in the Z-direction result in higher intensity of the plurality of haptic devices and closer detected objects result in higher intensity of the plurality of haptic devices.

8. The system of claim 7, wherein the plurality of sensors includes one or more cameras, sonar, accelerometer, radar, global positioning system, electronic compass, and lidar.

9. The system of claim 7, wherein the plurality of haptic devices includes one or more vibrational devices, pressure devices, or temperature devices.

10. The system of claim 7, wherein each of the plurality of haptic devices is disposed on one of proximal phalanx, middle phalanx, and distal phalanx spaces of the glove.

11. The system of claim 10, wherein each of the plurality of haptic devices is selectively activated along each of the proximal phalanx, middle phalanx, and distal phalanx spaces on each digit based on the user's position in the three-dimensional space.

12. The system of claim 7, wherein the user's position in the three-dimensional space includes the user's heading, navigation information, and positional information to an object, wherein the object includes one or more of a sidewalk, grass, crosswalks, doorways, stairs, and articles positioned in the path of the user.

13. A method of providing haptic feedback to a user, comprising:

receiving inputs from a plurality of input devices worn by a user corresponding to the user's environment;

generating a two-dimensional map of the user's three-dimensional space including spacing in an X-direction (a direction parallel to left-to-right of the user), spacing in Y-direction (a direction parallel to forward of the user that is perpendicular to the X-direction), and spacing in the Z-direction (a direction parallel to up-and-down of the user that is perpendicular to the X-direction and the Y-direction) based on the received inputs;

selectively activating each of a set of haptic devices forming a matrix of a plurality of m columns and a plurality of n rows disposed on an instrumented glove, wherein each finger of the instrumented glove is outfitted with a plurality of haptic devices, thus allowing for m×n haptic devices to signal the user's position in the three-dimensional space based on the generated two-dimensional map as the user moves in the three-dimensional space by mirroring the two-dimensional map to the m×n matrix representing the plurality of haptic devices, wherein the selectively activating each of the plurality of haptic devices is based on variation in intensity of the plurality of haptic devices based on proximity to detected objects by the plurality of sensors of differing heights and distances in the X-direction, the Y-direction, and the Z-direction, wherein shorter detected objects in the Z-direction result in higher intensity of the plurality of haptic devices and closer detected objects result in higher intensity of the plurality of haptic devices.

14. The method of claim 13, wherein the plurality of input devices includes one or more cameras, sonar, accelerometer, radar, global positioning system, electronic compass, and lidar.

15. The method of claim 13, wherein the plurality of haptic devices includes one or more vibrational devices, pressure devices, or temperature devices.

16. The method of claim 13, wherein each of the plurality of haptic devices is disposed on one of proximal phalanx, middle phalanx, and distal phalanx spaces of the glove.

17. The method of claim 16, wherein each of the plurality of haptic devices is selectively activated along each of the proximal phalanx, middle phalanx, and distal phalanx spaces on each digit based on the user's position in the three-dimensional space.

18. The method of claim 13, wherein the user's position in the three-dimensional space includes the user's heading, navigation information, and positional information to an object, wherein the object includes one or more of a sidewalk, grass, crosswalks, doorways, stairs, and articles positioned in the path of the user.

* * * * *